US012748377B2

(12) United States Patent
Hong et al.

(10) Patent No.: US 12,748,377 B2
(45) Date of Patent: Sep. 29, 2026

(54) HOLOGRAPHIC OPTICAL ELEMENT PRINTING METHOD USING TUNABLE FOCUS LENS AND ROTATING MIRROR

(71) Applicant: Korea Electronics Technology Institute, Seongnam-si (KR)

(72) Inventors: Ji Soo Hong, Seoul (KR); Sung Hee Hong, Seoul (KR); Young Min Kim, Seoul (KR); Jin Soo Jeong, Seoul (KR); Byoung Hyo Lee, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 514 days.

(21) Appl. No.: 18/013,321

(22) PCT Filed: Dec. 15, 2021

(86) PCT No.: PCT/KR2021/019023

§ 371 (c)(1),
(2) Date: Dec. 28, 2022

(87) PCT Pub. No.: WO2023/113060

PCT Pub. Date: Jun. 22, 2023

(65) Prior Publication Data

US 2024/0118661 A1 Apr. 11, 2024

(30) Foreign Application Priority Data

Dec. 13, 2021 (KR) ........................ 10-2021-0177358

(51) Int. Cl.
*G03H 1/02* (2006.01)
*G03H 1/04* (2006.01)

(52) U.S. Cl.
CPC ... *G03H 1/0476* (2013.01); *G03H 2001/0482* (2013.01); *G03H 2223/24* (2013.01);
(Continued)

(58) Field of Classification Search
CPC ........... G03H 2223/24; G03H 2225/32; G03H 2225/52; G03H 2001/0439; G03H 1/0465
(Continued)

(56) References Cited

U.S. PATENT DOCUMENTS 4,208,637 A * 6/1980 Matsuda .............. H01S 3/0635 359/569
4,498,740 A * 2/1985 Caulfield ................ G03H 1/30 359/9

(Continued)

*Primary Examiner* — Audrey Y Chang
(74) *Attorney, Agent, or Firm* — NSIP Law

(57) ABSTRACT

Provided is a holographic optical element printing method using a tunable focus lens and a rotating mirror. According to an embodiment, a holographic printer includes: a first optical engine and a second optical engine configured to adjust a phase of an incident collimated beam and emit the collimated beam; and a first reduction optical system and a second reduction optical system configured to reduce the beam emitted from the first optical engine and the second optical engine and to allow the beam to enter a holographic material, wherein each of the first optical engine and the second optical engine includes: a rotating mirror configured to reflect while adjusting the phase of the incident collimated beam through rotation; and a tunable focus lens configured to refract while adjusting the phase of the incident collimated beam reflected from the rotating mirror through focus tuning. Accordingly, by using a combination of a tunable focus lens and a rotating mirror, instead of using an SLM of a holographic printer, quality of an HOE may be enhanced, a printing time per hogel may be reduced and a total recording time may be greatly reduced when holographic printing of the HOE is performed.

13 Claims, 5 Drawing Sheets

(52) U.S. Cl.
CPC ..... *G03H 2225/32* (2013.01); *G03H 2225/52* (2013.01); *G03H 2226/00* (2013.01)

(58) Field of Classification Search
USPC .................................................. 359/1, 10, 35
See application file for complete search history.

(56) References Cited

U.S. PATENT DOCUMENTS

| | | | | |
|---|---|---|---|---|
| 6,262,818 | B1 * | 7/2001 | Cuche | G03H 1/0866 359/9 |
| 2007/0285751 | A1 * | 12/2007 | Kim | G03H 1/26 |
| 2018/0181064 | A1 * | 6/2018 | Zhang | G03H 1/0402 |

* cited by examiner

HOLOGRAPHIC OPTICAL ELEMENT PRINTING METHOD USING TUNABLE FOCUS LENS AND ROTATING MIRROR

CROSS REFERENCE TO RELATED APPLICATIONS

This application is a U.S. National Stage Application of International Application No. PCT/KR2021/019023, filed on Dec. 15, 2021, which claims the benefit under 35 USC 119(a) and 365(b) of Korean Patent Application No. 10-2021-0177358, filed on Dec. 13, 2021 in the Korean Intellectual Property Office, the entire disclosure of which is incorporated herein by reference for all purposes.

TECHNICAL FIELD

The present disclosure relates to a holographic printer, and more particularly, to a holographic printer for manufacturing by printing a holographic optical element (HOE) on a holographic material.

BACKGROUND ART

Related-art holographic printing is a method for reproducing a hologram image that has a large amount of information equivalent to an analogue hologram from digital information, by demagnifying digital image information displayed on a spatial light modulator (SLM) having a small amount of information as shown in FIG. 1 to one hogel on a holographic material as shown in FIG. 2, letting one hogel as an object beam interfere with a separate reference beam and recording, and tiling as shown in FIG. 1.

In particular, when information on the SLM is demagnified to hogels, a complex field value having both an amplitude and a phase may be recorded by performing spatial bandpass filtering through a 4f-system. In addition, an HOE that requires only phase information without amplitude information may be manufactured through holographic printing.

However, the related-art holographic printing may use a first-order diffraction component of the SLM in order to represent a complex field value, and in this process, a DC value where most of energy is concentrated may be discarded and thus very low light efficiency may be provided.

As a result, energy transmitted to a holographic material when hologram printing is performed may be reduced and time required to record per hogel may increase, which results in problems of degradation of hologram recording quality caused by a vibration, increase of total recording time.

DISCLOSURE

Technical Problem

The present disclosure has been developed in order to address the above-discussed deficiencies of the prior art, and an object of the present disclosure is to provide a holographic printer which is capable of representing phase information without a DC value that should be filtered, by using a combination of a tunable focus lens and a rotating mirror, instead of using an SLM, and a HOE printing method thereof, as a solution for enhancing quality of the HOE, reducing a printing time per hogel, and greatly reducing a total recording time, in manufacturing the HOE by holographic printing.

Technical Solution

According to an embodiment of the present disclosure to achieve the above-described object, there is provided a holographic printer including: a first optical engine configured to adjust a phase of an incident collimated beam and emit the collimated beam; a first reduction optical system configured to reduce the beam emitted from the first optical engine and to allow the beam to enter a holographic material; a second optical engine configured to adjust a phase of an incident collimated beam and emit the collimated beam; and a second reduction optical system configured to reduce the beam emitted from the second optical engine and to allow the beam to enter the holographic material, wherein each of the first optical engine and the second optical engine includes: a rotating mirror configured to reflect while adjusting the phase of the incident collimated beam through rotation; and a tunable focus lens configured to refract while adjusting the phase of the incident collimated beam reflected from the rotating mirror through focus tuning.

Each of the first optical engine and the second optical engine may further include an aperture configured to limit a width of the incident collimated beam to a defined width, and to transmit the collimated beam toward the rotating mirror, and the defined width may be equal to an effective width of the tunable focus lens.

Each of the first optical engine and the second optical engine may further include a beam splitter configured to reflect the collimated beam passing through the aperture and transmit the collimated beam to the rotating mirror, and to pass the collimated beam reflected from the rotating mirror toward the tunable focus lens.

Each of the first optical engine and the second optical engine may further include an optical system configured to transmit the collimated beam passing through the beam splitter to the tunable focus lens.

The holographic printer according to an embodiment of the disclosure may further include a beam splitter configured to split a collimated beam generated from a light source into the first optical engine and the second optical engine.

A first collimated beam split at the beam splitter may directly enter the first optical engine, and a second collimated beam split at the beam splitter may be reflected through at least one mirror and may enter the second optical engine.

The tunable focus lens may be an ETL.

A rotation angle of the rotating mirror and a focus of the tunable focus lens may be adjusted according to information of each hogel to be recorded on the holographic material.

Each hogel to be recorded on the holographic material may constitute an HOE.

According to another embodiment of the present disclosure, there is provided a holographic printing method including: adjusting, by a first optical engine, a phase of an incident collimated beam and emitting the collimated beam; reducing, by a first reduction optical system, the beam emitted from the first optical engine and allowing the beam to enter a holographic material; adjusting, by a second optical engine, a phase of an incident collimated beam and emitting the collimated beam; and reducing, by a second reduction optical system, the beam emitted from the second optical engine and allowing the beam to enter the holographic material, wherein each of the first optical engine and the second optical engine includes: a rotating mirror configured to reflect while adjusting the phase of the incident collimated beam through rotation; and a tunable focus lens configured to refract while adjusting the phase of the incident collimated beam reflected from the rotating mirror through focus tuning.

According to another embodiment of the present disclosure, there is provided a holographic printer including: a light source configured to generate a collimated beam; a first optical engine configured to adjust a phase of the collimated beam generated at the light source, and to emit the collimated beam; a first reduction optical system configured to reduce the beam emitted from the first optical engine and to allow the beam to enter a holographic material; a second optical engine configured to adjust a phase of the collimated beam generated at the light source, and to emit the collimated beam; and a second reduction optical system configured to reduce the beam emitted from the second optical engine and to allow the beam to enter the holographic material, wherein each of the first optical engine and the second optical engine includes: a rotating mirror configured to reflect while adjusting the phase of the incident collimated beam through rotation; and a tunable focus lens configured to refract while adjusting the phase of the incident collimated beam reflected from the rotating mirror through focus tuning.

According to another embodiment of the present disclosure, there is provided a holographic printing method including: generating, by a light source, a collimated beam; adjusting, by a first optical engine, a phase of the collimated beam generated at the light source, and emitting the collimated beam; reducing, by a first reduction optical system, the beam emitted from the first optical engine and allowing the beam to enter a holographic material; adjusting, by a second optical engine, a phase of the collimated beam generated at the light source, and emitting the collimated beam; and reducing, by a second reduction optical system, the beam emitted from the second optical engine and allowing the beam to enter the holographic material, wherein each of the first optical engine and the second optical engine includes: a rotating mirror configured to reflect while adjusting the phase of the incident collimated beam through rotation; and a tunable focus lens configured to refract while adjusting the phase of the incident collimated beam reflected from the rotating mirror through focus tuning.

Advantageous Effects

According to embodiments of the present disclosure as described above, phase information may be represented without a DC value that should be filtered, by using a combination of a tunable focus lens and a rotating mirror, instead of using an SLM of a holographic printer, so that quality of an HOE may be enhanced, a printing time per hogel may be reduced and a total recording time may be greatly reduced when holographic printing of the HOE is performed.

BEST MODE

Hereinafter, the present disclosure will be described in more detail with reference to the drawings.

An ETL is a tunable focus lens that has the form of a lens with a thin polymer membrane being filled with a liquid, and is able to change a focal distance by changing the shape of the lens by moving a peripheral circular ring according to an electrical signal.

Figure 1:
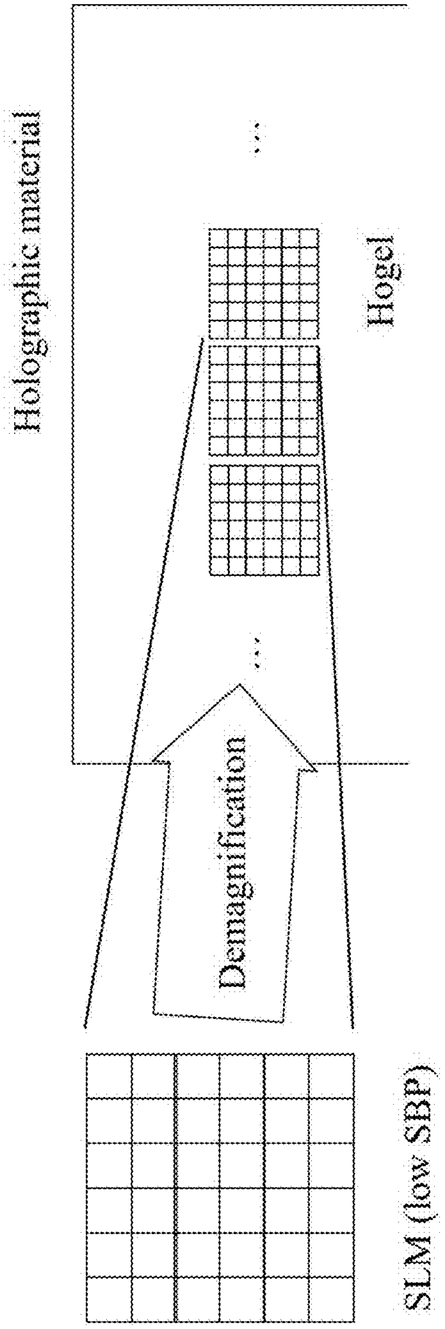
FIG. 1 (Related Art)
FIG. 1 is a view illustrating a holographic printing method (hogel and tiling)
Figure 2:
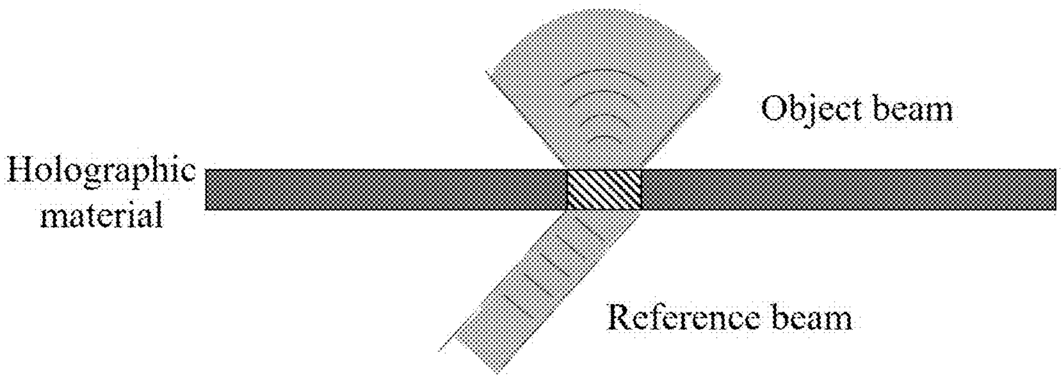
FIG. 2 (Related Art)
FIG. 2 is a view illustrating a holographic printing method (a method of recording a hogel)
Figure 3:
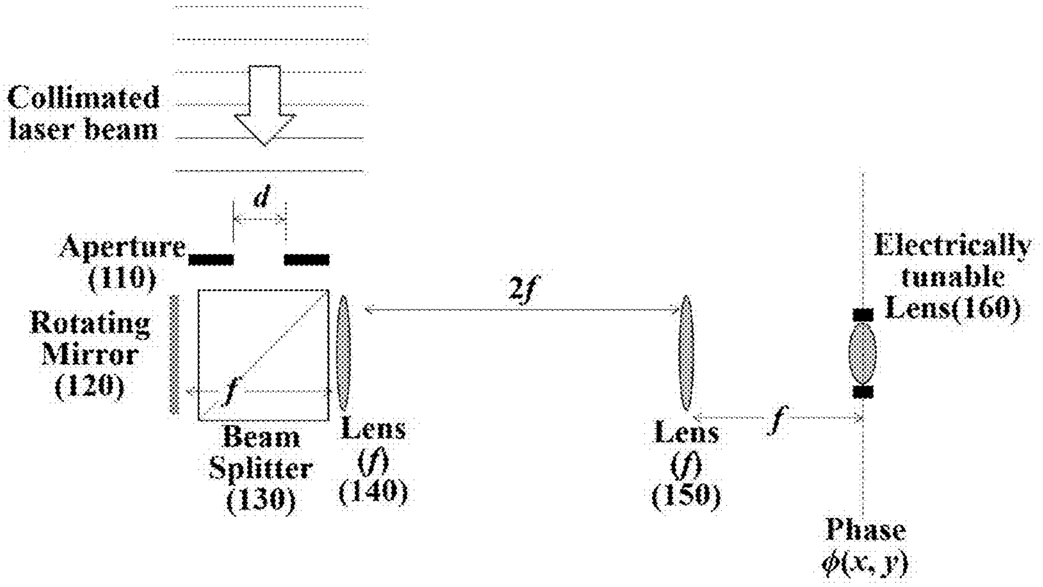
FIG. 3 is a view illustrating an optical engine for wavefront printing based on an electrically tunable lens (ETL) and a rotating mirror.

As shown in FIG. 3, a collimated laser beam is made to enter such an ETL 160, and, when the angle of incident is changed through a rotating mirror 120, a phase $\phi(x, y)$ right after passing through the ETL 160 is expressed by a sum of a phase $\phi_M(x, y)$ by the rotating mirror 120 and a phase $\phi_L(x, y)$ by the ETL 160 as indicated by the following equation:

$$\phi(x, y) = \phi_M(x, y) + \phi_L(x, y)$$

In this case, if rotation angles of the rotating mirror 120 in x, y directions are $\theta_x$, $\theta_y$, angles of reflection on an optical axis of the collimated beam are expressed by $2\theta_x$, $2\theta_y$, and accordingly, the phase $\phi_M(x, y)$ by the rotating mirror 120 may be calculated by the following equation:

$$\phi_M(x, y) = k(x\sin 2\theta_x + y\sin 2\theta_y)$$

where k is a wave number and equals $2\pi/\lambda$ ($\lambda$ is a wavelength).

The phase $\phi_L(x, y)$ by the ETL 160 may be calculated by the following equation if a focal distance of the ETL 160 is $f_L$:

$$\phi_L(x, y) = -\frac{|f_L|}{f_L} k\sqrt{x^2 + y^2 + f_L^2}$$

When the focal distance is long enough, the above-described equation may be approximated as follows through paraxial approximation:

$$\phi_L(x, y) \cong -\frac{k}{2f_L}(x^2 + y^2)$$

Accordingly, the rotating mirror 120 reflects the beam while adjusting the phase of the beam entering through rotation, and the ETL 160 refracts the collimated beam entering after being reflecting from the rotating mirror 120 while adjusting the phase of the collimated beam by tuning a focus.

FIG. 3 shows an optical engine for implementing this. The collimated laser beam entering from above an aperture 110 passes through the aperture 110 having a width of d. In this case, d is equal to an effective width of the ETL 160. That is, the aperture 110 limits the width of the entering collimated laser beam to the effective width of the ETL 160, and transmits the collimated laser beam to the rotating mirror 120.

The collimated laser beam passing through the aperture 110 is reflected by a beam splitter 130 and then is reflected on the rotating mirror 120 again, and passes through the beam splitter 130 and arrives at a lens-1 140 having a focal distance f.

In this case, a distance between the rotating mirror 120 and the lens-1 140 is equal to the focal distance f of the lens. An optical path after passing through the lens-1 140 propagates by a distance of 2f, and then, meets a lens-2 150 of the focal distance f, and passes through the lens-2 150, travels by a distance of f, and then, arrives at the ETL 160. Due to the above-described optical path, the two lenses 140, 150 form a 4f system.

Figure 4:
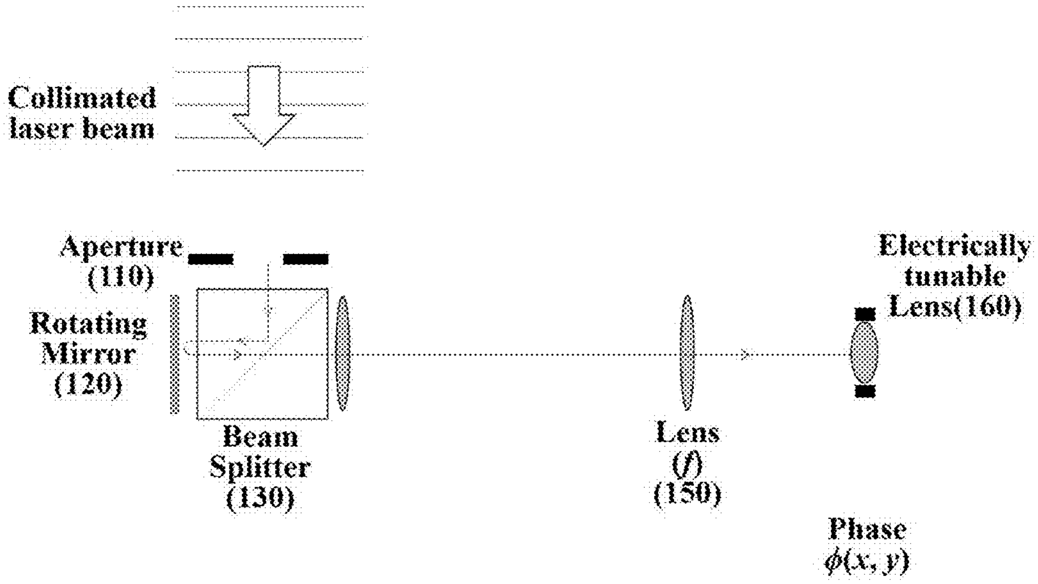
FIGS. 4 to 6 are views illustrating operations of the optical engine for wavefront printing based on the ETL and the rotating mirror.
Figure 5:
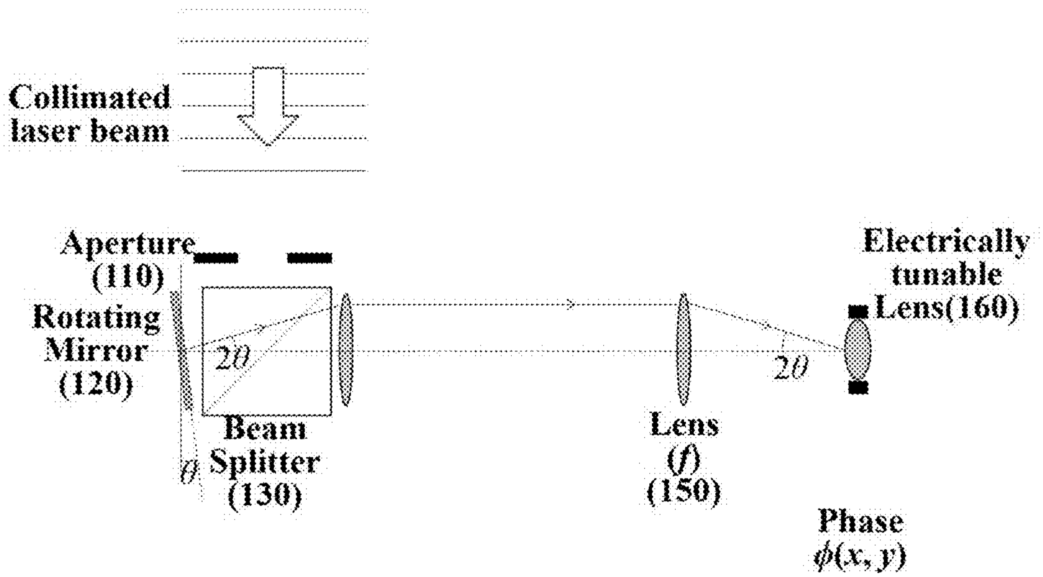
Figure 6:
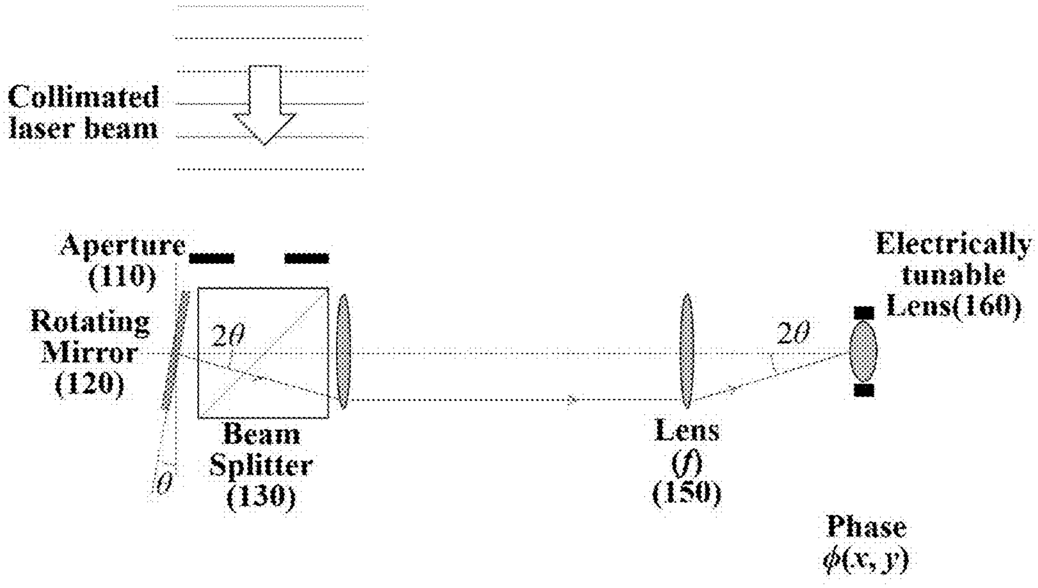

FIGS. 4 to 6 illustrate a method for applying a carrier wave to the ETL 160 by the rotating mirror 120.

FIG. 4 illustrates an optical path of a collimated laser beam when the rotating mirror 120 does not rotate. As described above, the collimated laser beam passing through the aperture 110 is reflected on the beam splitter 130 along a path indicated by the arrow line, and is reflected on a surface of the rotating mirror 120, passes through the two lenses 140, 150, and then, arrive at the ETL 160. In this case, the incident beam perpendicularly enters the surface of the ETL 160, and a spatial frequency of a carrier wave is 0.

FIGS. 5 and 6 illustrate an optical path when the rotating mirror 120 rotates vertically. When the rotating mirror rotates by θ, the incident beam reflected on the surface of the rotating mirror 120 is reflected with an angle of 2θ along the arrow line, travels, passes through the two lenses 140, 150, and then, arrives at the ETL 160. In this case, the incident beam enters a surface of the ETL 160 with the angel of 2θ, and phase information on the surface of the ETL 160 is shifted in a spectral domain with a spatial frequency corresponding to a tilting angle of the incident beam as a carrier frequency.

Figure 7:
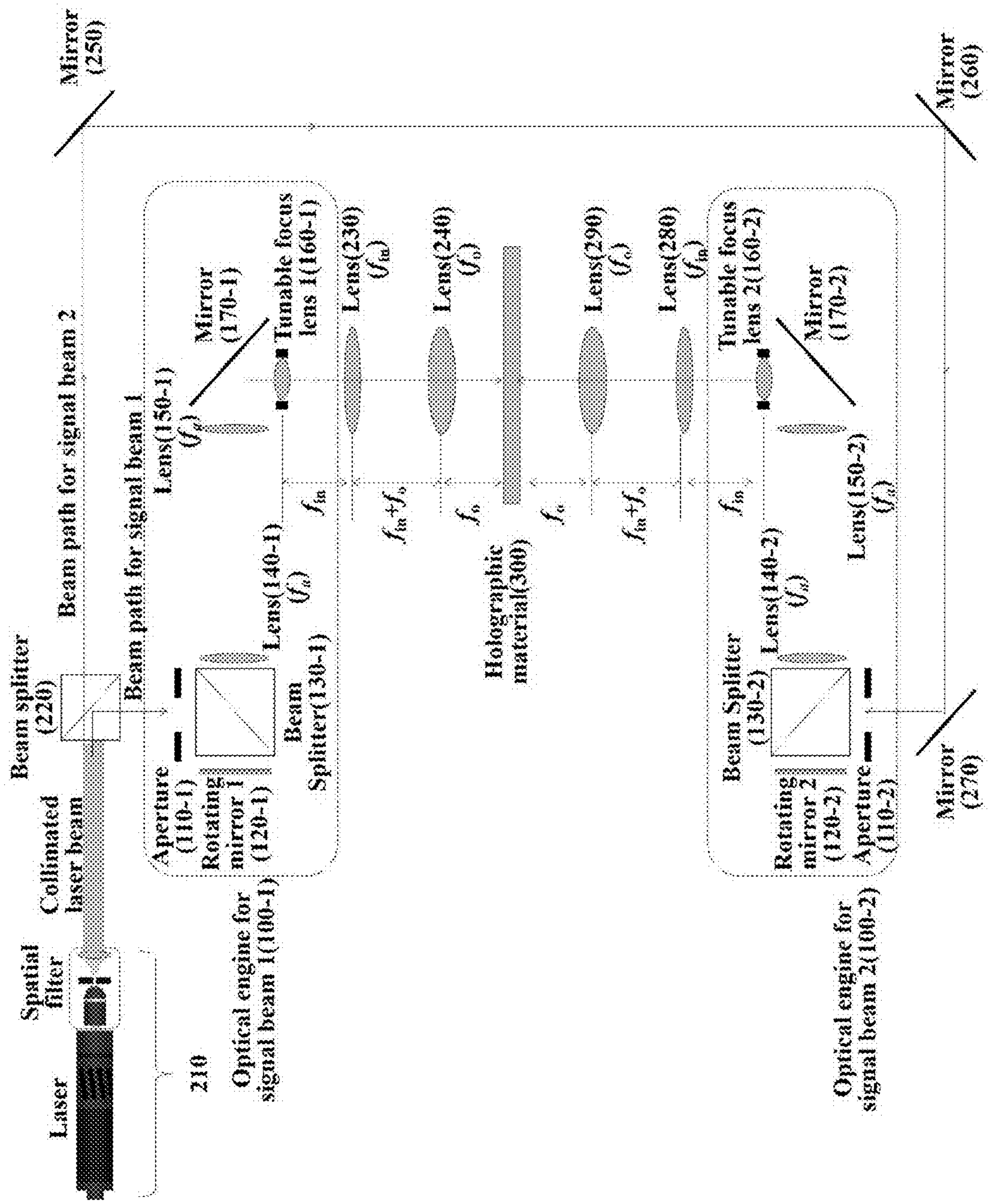
FIG. 7 is a holographic printer to which an ETL and a rotating mirror are applied.

FIG. 7 is a conceptual diagram of a holographic printer to which the optical engine applying the ETL 160 and the rotating mirror 120 of FIG. 3 is applied. The holographic printer according to an embodiment of the disclosure employs two optical engines 100-1, 100-2, and is configured to make beams modulated by the optical engines 100-1, 100-2 interfere with each other over a holographic material 300.

More specifically, a laser constituting a light source 210, a collimated laser beam generated by a spatial filter and a collimating lens are split into two optical paths through a beam splitter 220. The two beams are referred to as a signal beam 1 and a signal beam 2 as shown in FIG. 7.

The signal beam 1 enters an aperture 110-1 of the optical engine 100-1 which emits an incident collimated beam while adjusting the phase of the beam, and passes through the optical path as described in FIGS. 4 to 6, and eventually, passes through the ETL-1 160-1 and is output as a diffracted beam.

In this case, a mirror 170-1 is positioned at a front end of the ETL-1 160-1 to bend the optical path by 90 degrees and to easily form the optical path, which is different from FIG. 3. However, this configuration is optically the same as in FIG. 3.

The beam outputted in this way may reduce phase distribution of the surface of the ETL-1 160-1 at a ratio of $f_o/f_{in}$ through a reduction optical system, which includes a lens 230 having a focal distance of $f_{in}$ and a lens 240 having a focal distance of $f_o$, and may image phase information on a surface of the holographic material 300. The phase information imaged in this way may be recorded on the surface of the holographic material as one hogel through interference with the signal beam 2.

The signal beam 2 also reduces phase distribution of a surface of the ETL 160-2 and images phase information on a surface of the holographic material through the same process as the signal beam 1.

Specifically, the signal beam 2 is reflected through mirrors 250, 260, 270 and enters an aperture 110-2 of the optical engine 100-2, which emits an incident collimated beam while adjusting the phase of the collimated beam, and passes through the optical path as described in FIGS. 4 to 6, and eventually, passes through the ETL-2 160-2 and is outputted as a diffracted beam.

A mirror 170-2 is positioned at a front end of the ETL-2 160-2 to bend the optical path by 90 degrees and to easily form the optical path, which is different from FIG. 3. However, this configuration is optically the same as in FIG. 3.

The beam outputted in this way may reduce phase distribution of the surface of the ETL-2 160-2 at a ratio of $f_o/f_{in}$ through a reduction optical system, which includes a lens 280 having a focal distance of f in and a lens 290 having a focal distance of $f_o$, and may image phase information on a surface of the holographic material 300. The phase information imaged in this way may be recorded on the surface of the holographic material as one hogel through interference with the signal beam 1.

In this case, a reduction ratio of the reduction optical system may be different from that of the signal beam 1. When each hogel is recorded, hogel information to be recorded may be modulated by adjusting rotation angles of the rotating mirror-1 120-1 and the rotating mirror 120-2 and adjusting the focal distances of the ETL-1 160-1 and the ETL-2 160-2.

That is, an incident beam may be modulated by adjusting an amount of phase adjustment of each optical engine 100-1, 100-2 according to information of each hogel constituting an HOE to be recorded on the holographic material 300, that is, characteristics of the HOE.

In this case, if the reduction ratio of the reduction optical system is high enough to reduce the size of each hogel to be small enough and a difference between grating vectors in each hogel is not great, an optimal combination of rotation angles of the rotating mirror-1 120-1 and the rotating mirror-2 120-2 and focal distances of the ETL-1 160-1 and the ETL-2 160-2 that can record close to a desired grating vector may be found.

For easy explanation, if changes in an angle with an axis perpendicular to the surface of the holographic material 300, which are caused by rotation of the rotating mirrors 120-1, 120-2 after beams pass through the reduction optical systems, are $\theta_{Sx}$, $\theta_{Sy}$ and a focal distance value of the ETL 160-1, 160-2 that meaningfully influences on the surface of the holographic material 300 by the reduction optical system is $f_s$, a complex field made by each signal beam on the surface of the holographic material 300 may be calculated by the following equation:

$$h_S(x, y; k_{Sx}, k_{Sy}, f_S) = h_M(x, y; k_{Sx}, k_{Sy}) \cdot h_L(x, y; f_S) =$$

$$\exp\left[j\left(k_{Sx}x + k_{Sy}y - \frac{|f_S|}{f_S}k\sqrt{x^2 + y^2 + f_S^2}\right)\right] \cong$$

-continued $$\exp\left\{j\left[k_{Sx}x+k_{Sy}y-\frac{k}{2f_s}(x^2+y^2)\right]\right\}$$

In this case, the last line is an expression when paraxial approximation is applied. A phase value regarding this may be calculated by the following equation:

$$\phi_S(x, y; k_{Sx}, k_{Sy}, f_S) = \measuredangle h_S(x, y; k_{Sx}, k_{Sy}, f_S) = k_{Sx}x+k_{Sy}y-\frac{|f_S|}{f_S}k\sqrt{x^2+y^2+f_S^2} \cong k_{Sx}x+k_{Sy}y-\frac{k}{2f_S}(x^2+y^2)$$

The last line is also an expression that reflects paraxial approximation. In order to acquire a corresponding local k-vector, a given phase ϕ(x, y) is converted into a continuous phase function $\tilde{\phi}$(x, y) through phase-unwrapping, and the local k-vector is obtained by applying a first order partial differentiation equation presented below:

$$k_x=\frac{\partial\tilde{\phi}}{\partial x},\ k_y=\frac{\partial\tilde{\phi}}{\partial y}$$

If expressions corresponding to respective signal beam paths are re-written by using subscripts 1, 2, complex fields made by the signal beam 1 and the signal beam 1 on the surface of the holographic material may be written as follows, respectively;

$$h_{S1}(x, y; k_{S1x}, k_{S1y}, f_{S1}) = h_{M1}(x, y; k_{S1x}, k_{S1y})\cdot h_{L1}(x, y; f_{S1})$$
$$h_{S2}(x, y; k_{S2x}, k_{S2y}, f_{S2}) = h_{M2}(x, y; k_{S2x}, k_{S2y})\cdot h_{L2}(x, y; f_{S2})$$

Phases may be written as follows, respectively;

$$\phi_{S1}(x, y; k_{S1x}, k_{S1y}, f_{S1}) = \measuredangle h_{S1}(x, y; k_{S1x}, k_{S1y}, f_{S1})$$
$$\phi_{S2}(x, y; k_{S2x}, k_{S2y}, f_{S2}) = \measuredangle h_{S2}(x, y; k_{S2x}, k_{S2y}, f_{S2})$$

If distribution of the complex fields and the phases obtained thereby is sampled by M×N and is given as a discrete signal indexed like (m, n), a local grating vector at each position (m, n) may be expressed in the form of a matrix as follows:

$$K_{S1x}(m, n)=\frac{\partial\tilde{\phi}_{S1}(m, n)}{\partial x},\ K_{S1y}(m, n)=\frac{\partial\tilde{\phi}_{S1}(m, n)}{\partial y},$$
$$K_{S2x}(m, n)=\frac{\partial\tilde{\phi}_{S2}(m, n)}{\partial x},\ K_{S2y}(m, n)=\frac{\partial\tilde{\phi}_{S2}(m, n)}{\partial y}$$

In this regard, a k-vector in a z-direction may be determined by the following equations:

$$K_{S1z}=\sqrt{\left(\frac{2\pi}{\lambda}\right)^2-[K_{S1x}(m, n)]^2-[K_{S1y}(m, n)]^2},$$

-continued $$K_{S2z}=\sqrt{\left(\frac{2\pi}{\lambda}\right)^2-[K_{S2x}(m, n)]^2-[K_{S2y}(m, n)]^2}$$

Local grating vectors recorded by the local k-vectors on an inside of the holographic material 300 may be expressed by the following equations:

$$K_{Gx}=K_{S1x}-K_{S2x},$$
$$K_{Gy}=K_{S1y}-K_{S2y},$$
$$K_{Gz}=K_{S1z}-K_{S2z},$$

The aim of designing for optimization is to diffract and output a target beam of $$K_T^{(m,n)}=(K_{Tx}(m, n), K_{Ty}(m, n), K_{Tz}(m, n))$$

when a probe beam $$K_P^{(m,n)}=(K_{Px}(m, n), K_{Py}(m, n), K_{Pz}(m, n))$$

enters the local grating vector written as de scribed above. The k-vector $$K_D^{(m,n)}=(K_{Dx}(m, n), K_{Dy}(m, n), K_{Dz}(m, n))$$

regarding a beam diffracted and outputted by the recorded local grating vector may be obtained by the following equations:

$$K_{Dx}=K_{Px}+K_{Gx}=K_{Px}+K_{S1x}-K_{S2x},$$
$$K_{Dy}=K_{Py}+K_{Gy}=K_{Py}+K_{S1y}-K_{S2y},$$
$$K_{Dz}=\sqrt{k^2-K_{Dx}^2-K_{Dy}^2}$$

In this case, an error of directions of the k-vectors of the diffracted beam and the target beam may be an L2-norm therebetween, and may be defined by the following equation:

$$\left\|k_T^{(m,n)}-k_D^{(m,n)}\right\|_2=\sqrt{[K_{Tx}(m, n)-K_{Dx}(m, n)]^2+[K_{Tx}(m, n)-K_{Dx}(m, n)]^2+[K_{Tx}(m, n)-K_{Dx}(m, n)]^2}$$

In addition, it may be seen that degradation of diffraction efficiency caused by a k-vector different from that intended when a probe beam is recorded is proportional to a z component of the k-vector of the diffracted beam and a z component of the recorded grating vector, as indicated by the following expression:

$$\Delta\eta\propto|K_{Dz}(m, n)-K_{Gz}(m, n)|$$

Accordingly, the optimization may be performed for the purposes of minimizing both the direction error of the diffracted beam and the degradation of diffraction efficiency, and may be achieved by finding a combination of ($\theta_{S1x}$, $\theta_{S1y}$, $\theta_{S2x}$, $\theta_{S2y}$, $f_{S1}$, $f_{S2}$) for minimizing the two factors. However, these parameters are in a boundary condition in which they should be found within an operation range of each rotating mirror 120-1, 120-2 and ETL 160-1, 160-2. Accordingly, an optimization method reflecting all of these parameters may be expressed by the following expression:

$$\underset{\theta_{S1x},\theta_{S1y},\theta_{S2x},\theta_{S2y},f_{S1},f_{S2}}{\operatorname{argmin}} \sum_{(m,n)} \left\{ \left\| k_T^{(m,n)} - k_D^{(m,n)} \right\|_2 + \alpha \left| K_{Dz}(m, n) - K_{Gz}(m, n) \right| \right\}$$

s.t. $\theta_{S1x}$, $\theta_{S1y}$, $\theta_{S2x}$, $\theta_{S2y}$, $f_{S1}$, $f_{S2}$ inside the system working range In this case, $\alpha$ is a coefficient that determines which of the direction of the diffracted beam and the degradation of the diffraction efficiency influences the optimization more greatly.

Up to now, a holographic printer which is capable of representing phase information without a DC value that should be filtered, by using a combination of a tunable focus lens and a rotating mirror, instead of using an SLM, and a HOE printing method thereof have been described as a solution for enhancing quality of the HOE, reducing a printing time per hogel, and greatly reducing a total recording time, in manufacturing the HOE by holographic printing.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

The invention claimed is:

1. A holographic printer comprising:

a first optical engine configured to adjust a phase of an incident collimated beam and emit the collimated beam;

a first reduction optical system configured to reduce a size of the beam emitted from the first optical engine and to allow the beam to enter a holographic material;

a second optical engine configured to adjust a phase of an incident collimated beam and emit the collimated beam; and a second reduction optical system configured to reduce a size of the beam emitted from the second optical engine and to allow the beam to enter the holographic material, wherein each of the first optical engine and the second optical engine comprises:

a rotating mirror configured to reflect the incident collimated beam passing through an aperture, while adjusting the phase of the incident collimated beam through rotation of the rotating mirror, the rotating mirror being positioned downstream of the aperture aligned with an optical axis; and a tunable focus lens configured to refract and adjust the phase of the incident collimated beam reflected from the rotating mirror through focus tuning of the tunable focus lens, wherein each of the first optical engine and the second optical engine further comprises the aperture configured to limit a width of the incident collimated beam to a defined width, and to transmit the collimated beam toward the rotating mirror, and wherein the defined width is equal to an effective width of the tunable focus lens, wherein each of the first optical engine and the second optical engine further comprises a beam splitter configured to reflect the collimated beam passing through the aperture and transmit the collimated beam to the rotating mirror, and to pass the collimated beam reflected from the rotating mirror toward the tunable focus lens, and wherein each of the first optical engine and the second optical engine further comprises an optical system configured to transmit the collimated beam passing through the beam splitter to the tunable focus lens.

2. The holographic printer of claim 1, further comprising a beam splitter configured to split a collimated beam generated from a light source into the first optical engine and the second optical engine.

3. The holographic printer of claim 2, wherein a first collimated beam split at the beam splitter directly enters the first optical engine, and wherein a second collimated beam split at the beam splitter is reflected through at least one mirror and enters the second optical engine.

4. The holographic printer of claim 1, wherein the tunable focus lens is an ETL (Electrically Tunable Lens).

5. The holographic printer of claim 1, wherein a rotation angle of the rotating mirror and a focus of the tunable focus lens are adjusted according to information of each hogel to be recorded on the holographic material.

6. The holographic printer of claim 5, wherein each hogel to be recorded on the holographic material constitutes an HOE (Holographic Optical Element).

7. A holographic printing method comprising:

adjusting, by a first optical engine, a phase of an incident collimated beam and emitting the collimated beam;

reducing, by a first reduction optical system, the beam emitted from the first optical engine and allowing the beam to enter a holographic material;

adjusting, by a second optical engine, a phase of an incident collimated beam and emitting the collimated beam; and reducing, by a second reduction optical system, the beam emitted from the second optical engine and allowing the beam to enter the holographic material, wherein each of the first optical engine and the second optical engine comprises: a rotating mirror configured to reflect the incident collimated beam passing through an aperture, while adjusting the phase of the incident collimated beam through rotation of the rotating mirror, the rotating mirror being positioned downstream of the aperture aligned with an optical axis; and a tunable focus lens configured to refract while adjusting the phase of the incident collimated beam reflected from the rotating mirror through focus tuning of the tunable focus lens, wherein each of the first optical engine and the second optical engine further comprises the aperture configured to limit a width of the incident collimated beam to a defined width, and to transmit the collimated beam toward the rotating mirror, and wherein the defined width is equal to an effective width of the tunable focus lens, wherein each of the first optical engine and the second optical engine further comprises a beam splitter configured to reflect the collimated beam passing through the aperture and transmit the collimated beam to the rotating mirror, and to pass the collimated beam reflected from the rotating mirror toward the tunable focus lens, and wherein each of the first optical engine and the second optical engine further comprises an optical system configured to transmit the collimated beam passing through the beam splitter to the tunable focus lens.

8. The method of claim 7, further comprising a beam splitter configured to split a collimated beam generated from a light source into the first optical engine and the second optical engine.

9. The method of claim 8, wherein a first collimated beam split at the beam splitter directly enters the first optical engine, and wherein a second collimated beam split at the beam splitter is reflected through at least one mirror and enters the second optical engine.

10. The method of claim 7, wherein the tunable focus lens is an ETL (Electrically Tunable Lens).

11. The method of claim 7, wherein a rotation angle of the rotating mirror and a focus of the tunable focus lens are adjusted according to information of each hogel to be recorded on the holographic material.

12. The method of claim 11, wherein each hogel to be recorded on the holographic material constitutes an HOE (Holographic Optical Element).

13. A holographic printing method comprising:

generating, by a light source, a collimated beam;

adjusting, by a first optical engine, a phase of the collimated beam generated at the light source, and emitting the collimated beam;

reducing, by a first reduction optical system, the beam emitted from the first optical engine and allowing the beam to enter a holographic material;

adjusting, by a second optical engine, a phase of the collimated beam generated at the light source, and emitting the collimated beam; and reducing, by a second reduction optical system, the beam emitted from the second optical engine and allowing the beam to enter the holographic material, wherein each of the first optical engine and the second optical engine comprises: a rotating mirror configured to reflect the incident collimated beam passing through an aperture, while adjusting the phase of the incident collimated beam through rotation of the rotating mirror, the rotating mirror being positioned downstream of the aperture aligned with an optical axis; and a tunable focus lens configured to refract while adjusting the phase of the incident collimated beam reflected from the rotating mirror through focus tuning of the tunable focus lens, wherein each of the first optical engine and the second optical engine further comprises the aperture configured to limit a width of the incident collimated beam to a defined width, and to transmit the collimated beam toward the rotating mirror, and wherein the defined width is equal to an effective width of the tunable focus lens, wherein each of the first optical engine and the second optical engine further comprises a beam splitter configured to reflect the collimated beam passing through the aperture and transmit the collimated beam to the rotating mirror, and to pass the collimated beam reflected from the rotating mirror toward the tunable focus lens, and wherein each of the first optical engine and the second optical engine further comprises an optical system configured to transmit the collimated beam passing through the beam splitter to the tunable focus lens.

* * * * *